US008857562B2

(12) United States Patent
Morgan et al.

(10) Patent No.: US 8,857,562 B2
(45) Date of Patent: Oct. 14, 2014

(54) STANDARDISED INSULATION DEVICE FOR AN AIRCRAFT AND PROCESSES OF MAKING AND USING THEREOF

(71) Applicant: Airbus Operations (SAS), Toulouse (FR)

(72) Inventors: Axel Morgan, Fonsorbes (FR); Amelie Le Louarn, Le Gres (FR); Jerome Modesto, Larra (FR); Detlev Zum Felde, Bargteheide (DE)

(73) Assignees: Airbus Operations (SAS), Toulouse (FR); Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/719,473

(22) Filed: Dec. 19, 2012

(65) Prior Publication Data

US 2013/0161123 A1    Jun. 27, 2013

(30) Foreign Application Priority Data

Dec. 21, 2011    (FR) ...................................... 11 62227

(51) Int. Cl.

| | | |
|---|---|---|
| *E04B 1/74* | (2006.01) | |
| *B64C 1/40* | (2006.01) | |
| *B32B 3/06* | (2006.01) | |
| *E04B 1/84* | (2006.01) | |
| *E04B 1/62* | (2006.01) | |
| *B32B 3/02* | (2006.01) | |
| *B64C 1/00* | (2006.01) | |

(52) U.S. Cl.
CPC . *B64C 1/403* (2013.01); *B32B 3/06* (2013.01); *B64C 1/40* (2013.01); *E04B 1/84* (2013.01)

USPC ............ 181/284; 181/287; 428/76; 244/119; 244/121

(58) Field of Classification Search
USPC ............ 181/284, 287, 290, 295, 210; 428/76, 428/74, 99; 244/119, 117 R, 120, 121, 129.2
See application file for complete search history.

(56) References Cited

U.S. PATENT DOCUMENTS

| | | | | |
|---|---|---|---|---|
| 1,928,867 | A * | 10/1933 | Vrooman et al. | 428/74 |
| 2,129,167 | A * | 9/1938 | Cunnington | 428/223 |
| 2,739,412 | A * | 3/1956 | Ballonoff | 428/72 |
| 3,455,409 | A * | 7/1969 | Clark | 180/271 |
| 3,589,971 | A * | 6/1971 | Reed | 37/377 |
| 3,677,870 | A * | 7/1972 | McGuire | 42/136 |
| 4,258,821 | A * | 3/1981 | Wendt et al. | 181/202 |
| 4,653,246 | A * | 3/1987 | Hepler | 52/787.11 |
| 5,151,018 | A * | 9/1992 | Clendenin et al. | 417/312 |
| 5,274,200 | A * | 12/1993 | Das et al. | 181/202 |
| 5,300,178 | A * | 4/1994 | Nelson et al. | 156/292 |

(Continued)

*Primary Examiner* — Edgardo San Martin
(74) *Attorney, Agent, or Firm* — Greer, Burns & Crain, Ltd.

(57) ABSTRACT

An insulation device for an aircraft, comprising a blanket comprising a layer of insulation filling enclosed in a cover and having provision areas for the passage of aircraft components, these areas being devoid of insulation filling and being formed by a surface junction of two opposite faces of the cover inducing a recess in at least one face. The insulation device comprises an associated detachable complementary assembly to cover at least one of the provision areas, the assembly comprising a portion of insulation filling shaped to fit into the corresponding recess, and a retention arrangement for retaining this portion of filling. The retention arrangement is provided with a detachable arrangement for fixing the detachable complementary assembly on at least one face of the cover.

14 Claims, 2 Drawing Sheets

(56) References Cited

U.S. PATENT DOCUMENTS

| | | | | |
|---|---|---|---|---|
| 5,577,688 | A | * | 11/1996 | Sloan .................... 244/117 R |
| 5,624,726 | A | * | 4/1997 | Sanocki et al. ................ 428/74 |
| 5,811,167 | A | * | 9/1998 | Norvell .......................... 428/76 |
| 5,866,231 | A | * | 2/1999 | Bodin et al. ................. 428/131 |
| 6,358,591 | B1 | * | 3/2002 | Smith .............................. 428/74 |
| 6,776,258 | B1 | * | 8/2004 | Grosskrueger et al. ........ 181/294 |
| 7,357,219 | B2 | * | 4/2008 | Mafi et al. ..................... 181/202 |
| 7,584,582 | B1 | * | 9/2009 | Hutter, III ................. 52/506.02 |
| 7,874,400 | B2 | * | 1/2011 | Teisseyre ...................... 181/200 |
| 8,096,503 | B2 | * | 1/2012 | Verweyen ..................... 244/119 |
| 8,308,103 | B2 | * | 11/2012 | Boock et al. ................. 244/1 N |
| 2013/0299630 | A1 | * | 11/2013 | Redecker et al. ............. 244/1 N |

* cited by examiner

STANDARDISED INSULATION DEVICE FOR AN AIRCRAFT AND PROCESSES OF MAKING AND USING THEREOF

BACKGROUND OF THE INVENTION

This invention relates to the acoustic and/or thermal insulation of aircraft, particularly aircraft fuselages.

It relates to an insulation device of the type comprising at least one blanket to be placed along an aircraft wall to be insulated.

The invention also relates to a method of insulating an aircraft using such a device, and a method of manufacturing the device.

STATE OF PRIOR ART

Aircraft walls are frequently covered with blankets placed adjacent and in contact with each other, with good thermal and acoustic insulation properties in order to protect aircraft equipment and occupants and merchandise from cold and from noise caused particularly by propulsion of the aircraft. The inner surface of the aircraft fuselage is thus usually covered with a plurality of adjacent blankets.

These blankets typically comprise a thermal and acoustic insulation filling enclosed in a blanket cover with a first face that will be applied on an aircraft wall to be insulated and a second face opposite the first face.

However, it is usually necessary for a number of aircraft components to pass through these insulation blankets. These components can be support elements mounted on the wall to be insulated and designed to support various equipment such as electrical cables or conditioned air pipes.

One solution to this problem consists of providing reserved areas within the blanket for the passage of aircraft components, referred to as "provision areas" in the following. Each of these areas has no insulation filling and is formed by a surface junction of the two opposite faces of the blanket cover. A surface junction means that the two faces of the cover are attached to each other by two portions of their corresponding surfaces. The junction may be made either by direct welding of the two faces onto each other or by means of a layer of adhesive material such as glue, inserted between the two faces of the cover.

Each provision area is thus designed such that an opening can be formed in it, sealed with respect to the insulation filling so that one or several aircraft components can pass through the blanket without any risk of water entering the layer of insulation filling.

However, the configuration of aircraft components to be passed through the insulation blanket covering a determined aircraft wall can vary from one aircraft to another, even between several copies of the same aircraft model, for example when the models have different internal fittings or different onboard equipment.

Therefore, it is desirable to have standard insulation blankets, in other words suitable for several configurations of walls to be insulated, for aircrafts of a same model or of different types. This purpose can be achieved by providing a plurality of provision areas in a single insulation blanket, through which components can pass for different configurations of the wall to be insulated.

Thus, the configuration of the wall on which such an insulation blanket is installed determines the provision areas in which openings should be formed for the passage of aircraft components, while on the other hand provision areas that are not required are left intact.

Nevertheless, the presence of a large number of provision areas in these blankets reduces blanket performances in terms of acoustic and thermal insulation.

SUMMARY OF THE INVENTION

In particular, the purpose of the invention is to provide a simple, economic and efficient solution to this problem.

It discloses an insulation device for an aircraft, comprising at least one blanket comprising a layer of thermal and/or acoustic filling, enclosed in a blanket cover, in which the blanket has a plurality of reserved areas hereinafter called provision areas, each for the passage of at least one aircraft component, each of these areas not having any insulation filling (being devoid of insulation filling) and being formed by a surface junction of two opposite faces of the cover, inducing a recess in at least one of said opposite faces, such that an opening can be formed in the provision area and can remain leak tight relative to the insulation filling to enable the passage of at least one aircraft component through the blanket.

According to the invention, the device comprises a detachable complementary assembly associated with at least one of the above-mentioned provision areas to cover it, said assembly comprising a portion of thermal and/or acoustic insulation filling shaped to at least partly fit into the corresponding recess in said at least one face of the cover, and retention means for retaining this portion of filling in this recess, said retention means being provided with detachable fastening means for fixing the detachable complementary assembly on said at least one face of the cover.

The above-mentioned detachable complementary assembly can provide thermal and/or acoustic insulation of the corresponding provision area when the provision area is not used for the passage of an aircraft component.

Thus, when the blanket of the device is installed along a given aircraft wall for insulation of this wall, all provision areas that are not used for the passage of an aircraft component may advantageously be covered by an associated detachable complementary assembly.

The invention thus discloses a standard insulation device, in other words that can be compatible with different configurations of walls to be insulated and in particular with different configurations of aircraft components to be passed through the blanket, and for which the insulation properties remain optimal regardless of the type of aircraft wall to be insulated, despite the presence of extra provision areas.

The blanket cover is preferably formed by two films forming the two above-mentioned faces of the cover respectively, these two films being attached to each other by their corresponding peripheral edges.

In this case, the expression "surface junction" of the two faces of the cover to form a provision area should be understood as meaning that the two films forming the cover are attached to each other at a portion of their corresponding surfaces, for example by welding or gluing, or that one of the films, has an opening at the provision area, the edge of which is attached to the other film such that the other film alone forms the two faces of the cover at the above-mentioned provision area.

Since the blanket of the device is intended to be installed in contact with or in front of an aircraft wall, said at least one face of the cover that each above-mentioned detachable complementary assembly will cover is preferably the face that will be placed on the face opposite the wall to be insulated.

Furthermore, each of said provision areas may be formed at a distance from a peripheral edge of the blanket, or close to this edge, or it may be intercepted by this peripheral edge.

The filling portion of the above-mentioned detachable complementary assembly is preferably shaped to approximately fill in the corresponding recess in said cover face, to maximise the insulation provided by this detachable complementary assembly.

In a first preferred embodiment of the invention, the retention means for retaining the portion of insulation filling of said detachable complementary assembly are formed from a retention sheet configured to be fixed detachably on the blanket cover, such that the sheet covers the corresponding recess.

One particular advantage of the detachable complementary assembly according to this first embodiment of the invention is that it fits perfectly into the recess induced by the associated provision area, and is approximately flush with the said face of the blanket cover.

Furthermore, a process for manufacturing this detachable complementary assembly may easily be coupled to a process for manufacturing the blanket, as will be seen more clearly in the following.

The retention sheet is preferably attached using glue chosen to achieve sufficient bond of the detachable assembly on the blanket cover, while enabling manual detachment of this retention sheet without damaging the above-mentioned cover.

Such glue forms detachable fastening means, in the terminology of the present invention.

To achieve this, the retention sheet advantageously comprises an end part such as a corner, folded to facilitate gripping of the sheet during detachment of the sheet.

Furthermore, the blanket cover preferably comprises a stiffener on which the above-mentioned retention sheet will be fixed.

This stiffener, which may for example be composed of an additional film glued on the second face of the cover, protects the cover from any risk of damage during detachment of the retention sheet fixed on the stiffener, particularly in the case of attachment of this retention sheet by gluing.

The stiffener advantageously extends on and around the provision area. In this case, the stiffener delimits the recess induced by the provision area. This stiffener may thus have a simple shape, for example rectangular or circular, without holes.

As a variant, the retention sheet may be attached by reversible type detachable fastening means, in other words means that can be reused after detachment. In this case, these attachment means are for example of the hook and loop type, usually referred to as "Velcro."

In a second preferred embodiment of the invention, said detachable complementary assembly comprises an envelope in which the portion of insulation filling is enclosed and which forms said retention means.

The detachable complementary assembly is thus in the form of a unit assembly independent of the blanket of the device.

In this case, said detachable complementary assembly advantageously comprises a central part shaped to fit into the corresponding recess of the blanket, and a peripheral part provided with said detachable fastening means for fixing the detachable complementary assembly.

These detachable fastening means are preferably of the reversible type, for example of the hook and loop type usually referred to as "Velcro."

The invention also relates to an aircraft comprising at least one insulation device of the type mentioned above.

The invention also relates to a method for insulating an aircraft wall, such as a portion of fuselage, comprising:

preparation of an insulation device of the type described above, in which each provision area of the blanket through which at least one aircraft component will pass, is provided with a component passage opening and is not provided with a detachable complementary assembly, while at least one and preferably each provision area of the blanket through which no aircraft component passes, is covered by an associated detachable complementary assembly of which at least part of the insulation filling is housed in the recess induced by said provision area, and in which the retention means for retaining the insulation filling are fixed on said face of the blanket cover; then installation of this blanket along the aircraft wall, passing the corresponding at least one aircraft component through each component passage opening.

Covering using a detachable complementary assembly may only apply to some provision areas through which there will be no aircraft component passage. This covering preferably concerns all these provision areas in order to optimize insulation properties of this device.

Advantageously, each detachable complementary assembly of the insulation device is initially fixed on said at least one face of the blanket cover so as to cover the corresponding provision area, and the method for each provision area of the blanket through which at least one component of the aircraft can pass comprises steps comprising removing the detachable complementary assembly that covers the provision area, if necessary, and then forming the corresponding component passage opening in this provision area.

In other words, for each provision area that is initially covered by an associated detachable complementary assembly and through which it is planned to pass an aircraft component, said assembly is removed before forming the above-mentioned opening.

Consequently, the blanket initially appears as a unit part for which provision areas are masked.

This method is particularly suitable for an insulation device according to the first embodiment of the invention described above, but it can also be used with the insulation device according to the second embodiment of the invention described above.

As a variant, each detachable complementary assembly of the insulation device may be initially detached from said face of the blanket cover.

In this case, the method comprises steps comprising forming said component passage opening in each provision area of the blanket through which it is planned to pass at least one aircraft component, and for at least one provision area through which no component will pass, fixing the associated detachable complementary assembly on said at least one face of the blanket cover so as to cover this provision area.

Preferably, each provision area through which no component will pass is covered by an associated complementary assembly.

The invention finally relates to a method for manufacturing an insulation device of the type described above, comprising the following steps in sequence:

preparing a layer of thermal and/or acoustic insulation filling;

forming a plurality of through holes in said layer of insulation filling by enclosing the layer of insulation filling in a cover to form a blanket, the cover having two opposite faces;

forming a surface junction of the opposite faces of the cover through each of the holes in the insulation filling layer, inducing for each of these holes a recess in at least one of the faces of the cover so as to form provision areas;

for at least one of the provision areas formed as described above, preparing a detachable complementary assembly associated with this provision area and comprising a portion of thermal and/or acoustic insulation filling shaped to fit at least partly into the corresponding recess of said face of the cover, and means of retaining this portion of insulation filling, said retention means being provided with detachable means for fixing the detachable complementary assembly on said face of the cover.

Preparation of each detachable complementary assembly of the device advantageously comprises the following steps in sequence:

arranging at least part of the portion of insulation filling previously removed from the hole corresponding to the associated provision area, in the corresponding recess of said at least one face of the cover;

covering this provision area with at least one sheet, and fix part of this sheet in a detachable manner on said face of the cover to retain the portion of insulation filling, so as to form an insulation device conforming with the first embodiment of the invention described above.

The above-mentioned sheet thus forms a retention sheet, using the terminology of the invention.

Therefore, this method enables the use of insulation filling removed from the holes of the blanket filling layer, to fill each detachable complementary assembly.

The method for making detachable complementary assemblies thus forms part of the blanket manufacturing method, this method leading to a blanket in which at least one of the provision areas, and preferably each of these areas, is covered by an associated detachable complementary assembly.

The blanket thus obtained is individual thus facilitating its transport and storage.

In this case, the method preferably comprises a step for fixing stiffeners on said face of the cover, around each of the provision areas of the blanket, said part of the retention sheet of each detachable complementary assembly of the device then being fixed in a detachable manner on the corresponding stiffener.

This step for fixing stiffeners is advantageously performed after making the junction of the opposite faces of the cover.

Preferably, each stiffener covers the corresponding junction zone of the two cover faces, and delimits the corresponding recess at the end of the fixing step for this stiffener.

As a variant, preparation of each detachable complementary assembly of the device may comprise a step comprising enclosing a portion of thermal and/or acoustic insulation filling in an envelope such that the individual assembly thus obtained has a central portion shaped to fit into the corresponding recess of said face of the cover, and a peripheral portion that can be fixed detachably on said face of the cover.

BRIEF DESCRIPTION OF THE DRAWINGS

The invention will be better understood, and other details, advantages and characteristics will appear clear after reading the following description given as a non-limitative example with reference to the appended drawings in which.

Identical references in all these figures are used to denote identical or similar elements.

DETAILED DESCRIPTION OF THE PREFERRED EMBODIMENTS

Figure 1:
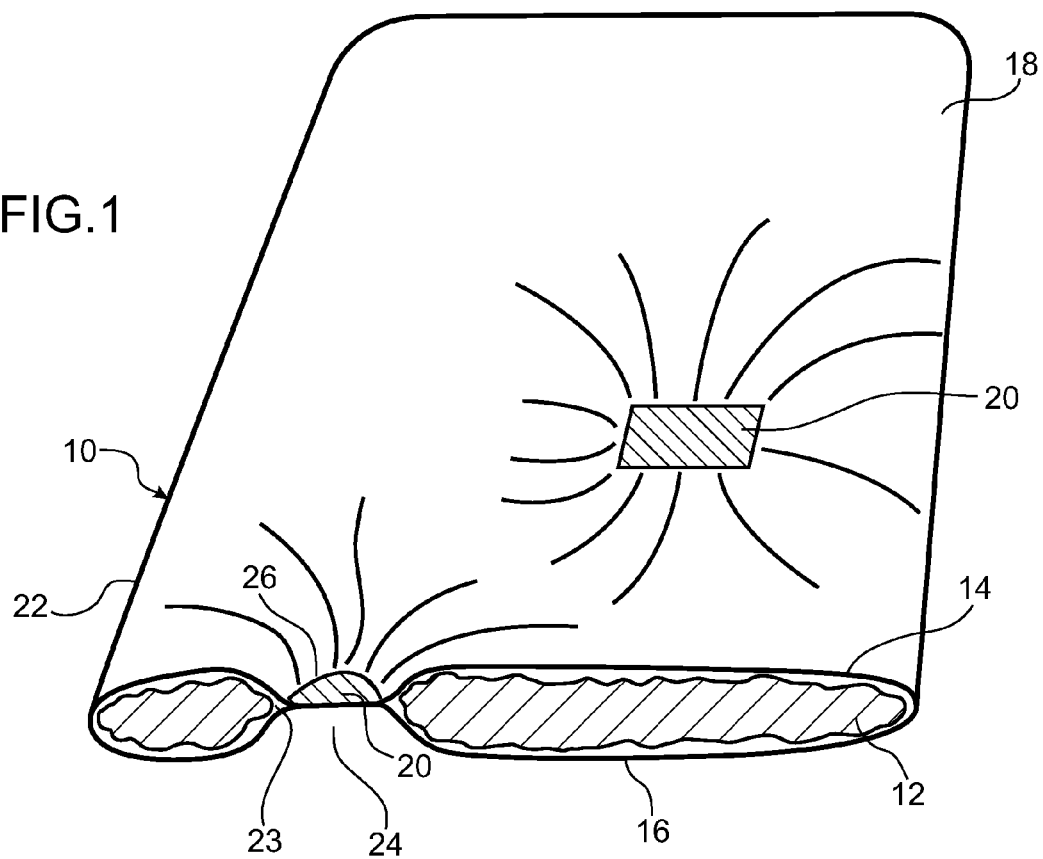
FIG. 1 is a partial diagrammatic perspective and sectional view of a blanket of an insulation device for an aircraft according to a first embodiment of the invention, shown without a detachable complementary assembly.
Figure 2:
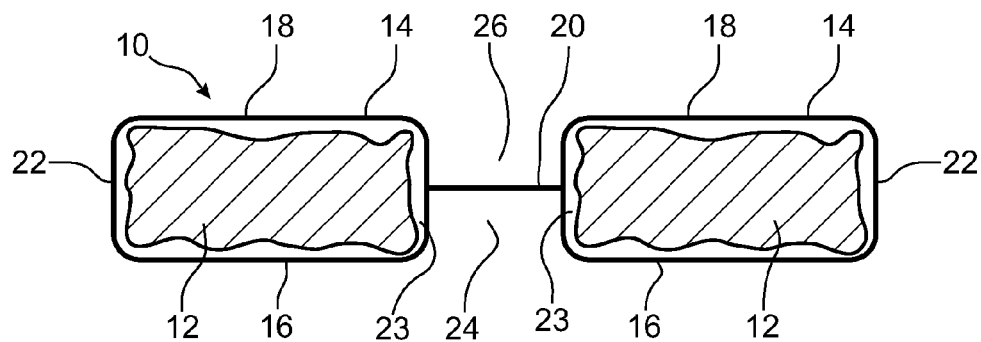
FIG. 2 is a partial diagrammatic sectional view of the blanket in FIG. 1.

FIGS. 1 and 2 show a blanket 10 that will be arranged on or in front of a wall in an aircraft for thermal and acoustic insulation of this wall. This wall may form part of the aircraft fuselage or any other element of the aircraft structure, or onboard equipment inside the aircraft.

This blanket is globally composed of a layer of insulation filling 12, for example formed from fibre glass enclosed in a cover 14.

The cover 14 is formed from a first film located on the bottom side in FIGS. 1 and 2, forming a first face 16 of the cover that will be placed on the side of the aircraft wall to be insulated, and a second film placed on the top side in FIG. 1, forming a second face 18 of the cover opposite its first face 16.

The blanket 10 is provided with a plurality of provision areas 20 each for the passage of one or several aircraft components such as particularly supports and conditioned air pipes. Two of these areas are visible in FIG. 1 and are called provision areas 20 throughout this description.

Each of these provision areas 20 is formed at a distance from or close to the peripheral edge 22 of the blanket 10, by a through hole 23 formed in the layer of insulation filling 12, and by welding two corresponding portions facing each other, of two films forming the opposite faces 16 and 18 of the cover 14, through this hole 23. Each provision area 20 thus has no insulation filling 12, and induces a recess 24, 26 in each of the two faces 16 and 18 of the cover 14, as shown in FIG. 2 showing one of the provision areas 20.

Each provision area 20 is thus designed such that an opening can be formed in it, sealed with respect to the filling 12 to enable the passage of at least one aircraft component through the blanket 10.

Figure 3:
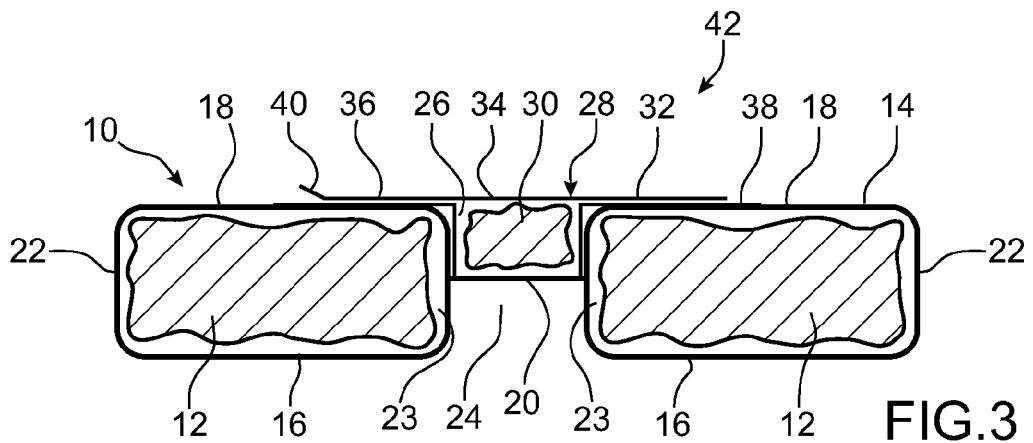
FIG. 3 is a view similar to FIG. 2, showing the blanket of the device and a detachable complementary assembly of this device, covering a provision area of the blanket.
Figure 4:
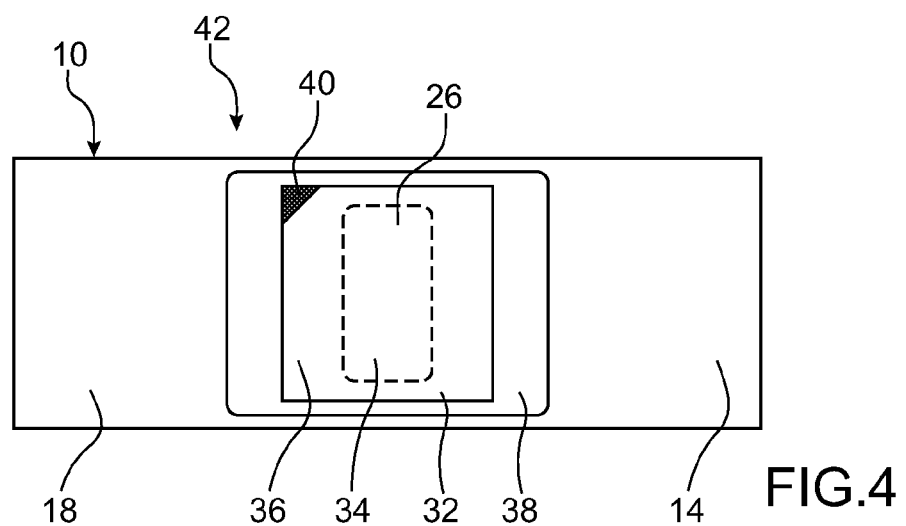
FIG. 4 is a partial diagrammatic top view of the insulation device in FIGS. 1 to 3.

FIGS. 3 and 4 show the provision area 20 of the blanket 10 visible in FIG. 2, covered by a detachable complementary assembly 28 to be used for thermal and acoustic insulation of the provision area 20.

To achieve this, the detachable complementary assembly 28 comprises a portion 30 of insulation filling, for example of the same nature as the filling layer 12 of the blanket 10, and a retention sheet 32 of the portion of filling 30.

The portion of filling 30 is shaped so that it fits into the recess 26 of the second face 18 of the cover 14.

The retention sheet 32 has a central part 34 covering this recess 26, and a peripheral part 36 glued onto the second face 18 of the cover around the entire recess 26.

The film forming the second face 18 of the cover 14 is coated with a stiffener 38 glued on this film and extending to the stiffener zone 20 and around its periphery. The stiffener 38 thus comprises a central part that delimits the recess 26, and a peripheral part that will be used for attachment of the peripheral part 36 of the retention sheet 32.

Furthermore, the retention sheet 32 comprises a corner 40 folded towards the outside of the blanket, in other words along the direction opposite the first face 16 of the cover 14, to facilitate gripping of the retention sheet 32 during its detachment.

The assembly formed by the blanket 10 associated with one or several detachable complementary assemblies 28 of the type described above, associated with the corresponding provision areas 20 of the blanket 10, forms a thermal and/or acoustic insulation device 42 according to the first embodiment of the invention.

The device 42 described above may be manufactured using a method comprising the following steps in sequence:

preparing a layer of thermal and/or acoustic insulation filling 12;

cutting out a plurality of through holes 23 in the layer of insulation filling 12, and remove a portion 30 of this filling from each of these holes 23;

enclosing the layer of insulation filling 12 thus obtained between two films and weld the corresponding edges of these films to each other to form a cover 14, so as to obtain a blanket 10 in which the cover 14 has a first face 16 intended to be applied on an aircraft wall to be insulated and a second face 18 opposite said first face 16;

welding corresponding portions of the surface of the opposite faces 16 and 18 of the cover 14 to each other through each of the holes 23 in the layer of insulation filling 12, inducing recesses 26 in the second face 18 of the cover 14, so as to form provision areas 20;

gluing stiffener(s) 38 on the second face 18 of the cover 14, on and around each of said provision areas 20 of the blanket 10, such that each stiffener 38 delimits the corresponding recess 26;

for each previously formed provision area 20, preparing an associated detachable complementary assembly 28.

For example, preparation of this detachable complementary assembly 28 may comprise the following steps:

arranging said portion 30 of insulation filling, previously taken from the hole 23 of the filling layer 12 corresponding to said associated provision area 20, in the corresponding recess 26 in the second face 18 of the cover 14, and then covering the provision area 20 with a retention sheet 32, and detachably glue a peripheral part 36 of this retention sheet 32 onto the stiffener 38 covering the provision area 20.

The device 42 described above, for which each detachable complementary assembly 28 is fixed onto the cover 14 of the blanket 10 so as to cover the corresponding provision area 20, may be used for insulation of an aircraft wall, such as a portion of the fuselage, using a method comprising the following steps:

for each provision area 20 of the blanket through which at least one aircraft component will pass, detaching the retention sheet 32 covering said provision area 20, extracting the portion 30 of insulation filling housed in the corresponding recess 26, then cutting out a component passage opening in this provision area 20;

installing the blanket 10 along said aircraft wall, allowing the aircraft components concerned to pass through the previously cutout component passage openings.

As a variant, each detachable complementary assembly 28 of the insulation device 42 may be initially detached from the cover 14 of the blanket 10. In this case, the insulation device 42 may be used as follows:

cutting out said component passage opening in each provision area 20 of the blanket 10, through which at least one aircraft component will pass; then for each provision area 20 through which no component will pass, arranging the portion 30 of insulation filling belonging to the associated detachable complementary assembly 28 in the corresponding recess 26, then covering the recess by means of a retention sheet 32, and detachably gluing a peripheral part 36 of this retention sheet 32 onto the stiffener 38 covering the provision area 20;

installing the blanket 10 on or in front of said aircraft wall, allowing the aircraft components concerned to pass through the previously cutout component passage openings.

Figure 5:
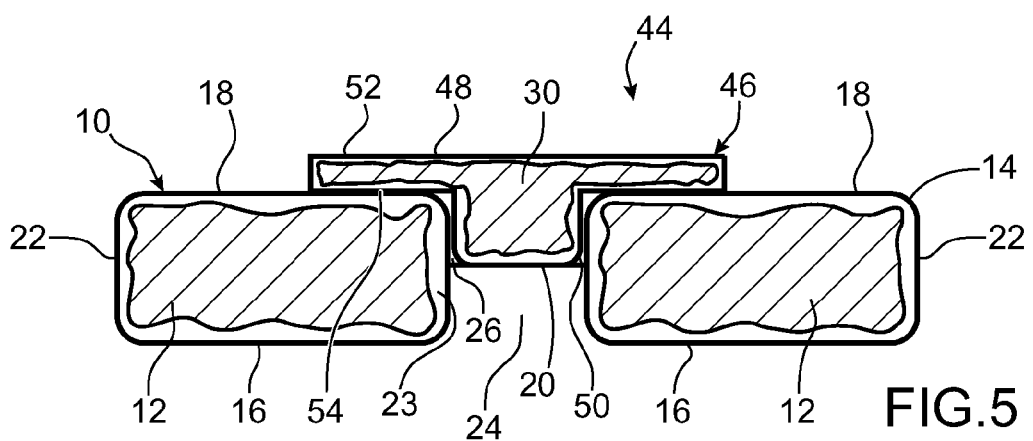
FIG. 5 is a partial diagrammatic sectional view of an insulation device according to a second embodiment of the invention.

FIG. 5, similar to FIG. 3, shows a second embodiment of the invention, in which the insulation device 44 comprises a blanket 10 similar to that described above, but the detachable complementary assemblies 46 are of a different type Thus, each detachable complementary assembly 46, as shown in FIG. 5, comprises an envelope 48 in which the portion of insulation filling 30 of the assembly is enclosed.

Each detachable complementary assembly 46 has a central part 50 shaped to fit into the corresponding recess 26 of the second face 18 of the cover 14, and a widened peripheral upper part 52 with a lower peripheral face 54 for attachment onto the second face 18 of the cover 14. This attachment may for example be made using a hook and loop attachment means of the type usually referred to as "Velcro," in which case this attachment means is reversible, in other words it can be detached and reused. Note that the envelope 48 thus forms retention means that retain the portion 30 of insulation filling in the recess 26.

In the example shown in FIG. 5, the portion of insulation filling 30 is shaped to fill in the central part 50 and also the peripheral part 52 of the detachable complementary assembly 46.

The insulation device 44 described above may be made using any method in which firstly the blanket 10, and secondly each detachable complementary assembly 46, are made independently.

Thus, the blanket 10 is for example made in a manner similar to the blanket of the device 42 described above, using a method comprising the following steps in sequence:

preparing a layer of thermal and/or acoustic insulation filling 12;

cutting out a plurality of through holes 23 in the layer of insulation filling 12, and remove a portion of this filling from each of these holes 23;

enclosing the layer of insulation filling 12 thus obtained between two films and welding the corresponding edges of these films to each other to form a cover 14, so as to obtain a blanket 10 in which the cover 14 has a first face 16 that will be applied to the aircraft wall to be insulated and a second face 18 opposite said first face 16;

welding the corresponding surface portions on the opposite faces 16 and 18 of the cover 14 to each other, through each of the holes 23 in the layer of insulation filling 12, inducing recesses 26 in the second face 18 of the cover 14, so as to form provision areas 20.

For example, production of each detachable complementary assembly 46 comprises the following steps:

preparing a portion 30 of insulation filling, with a central part shaped approximately so as to fill in a recess 26 associated with the second face 18 of the cover 14 of the blanket 10, and a widened peripheral upper part; then enclosing portion 30 of the insulation filling in a closed envelope 48.

The device 44 described above, for which each detachable complementary assembly 46 is initially detached from the cover 14 of the blanket 10, may be used as follows:

cutting out said component passage opening in each provision area 20 of the blanket 10 through which it is planned to pass at least one aircraft component, then installing the blanket 10 on or in front of the aircraft wall to be insulated, passing the aircraft component(s) concerned through the previously cutout component passage openings;

for each provision area 20 in which no component passage opening is cut out, fixing the associated detachable complementary assembly 46 on the second face 18 of the cover 14 of the blanket 10 so as to cover said provision area 20.

As a variant, this final step may be performed before installation of the blanket 10 along the aircraft wall to be insulated.

Also as a variant, each detachable complementary assembly 46 may initially be fixed onto the cover 14 of the blanket 10 so as to cover the corresponding provision area 20, in which case each complementary assembly 46 covering a provision area 20 through which an aircraft component will pass is removed, and the corresponding component passage openings are then formed, and the blanket 10 is installed.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An insulation device for an aircraft, comprising:
   at least one blanket having a layer of at least one of thermal and acoustic insulation filling enclosed in a cover of said blanket,
   the blanket having a plurality of provision areas, each provision area for the passage of at least one aircraft component,
   each of the provision areas being devoid of insulation filling and being formed by a surface junction of two opposite faces of the cover, inducing a recess in at least one of said opposite faces, such that an opening can be formed in the provision area sealed with respect to the layer of insulation filling so that at least one aircraft component can pass through the blanket,
   wherein, in order to cover at least one of said provision areas, said insulation device comprises a detachable complementary assembly associated with the at least one provision area,
   said detachable complementary assembly comprising a portion of at least one of thermal and acoustic insulation filling shaped to at least partly fit into the corresponding recess, and
   a retention arrangement to retain the portion of insulation filling in the recess,
   said retention arrangement being provided with a detachable fixing arrangement to fix said detachable complementary assembly on said at least one face of the cover, wherein the portion of insulation filling of said detachable complementary assembly is positioned between the cover in the corresponding provision area and an upper outer surface of said retention arrangement.

2. The insulation device according to claim 1, in which said retention arrangement is formed from a retention sheet configured to be fixed detachably on the cover of the blanket such that said sheet covers said recess.

3. The insulation device according to claim 2, in which the cover of the blanket comprises a stiffener on which said retention sheet can be fixed.

4. The insulation device according to claim 1, in which said detachable complementary assembly comprises an envelope in which said portion of insulation filling is enclosed, and which forms said retention arrangement.

5. The insulation device according to claim 4, in which said detachable complementary assembly comprises a central part shaped to fit into said recess of the blanket, and a peripheral part provided with said detachable fixing arrangement to fix the detachable complementary assembly on the cover.

6. A method for insulating an aircraft wall, wherein said method comprises the steps:
   preparing an insulation device including at least one blanket having a layer of at least one of thermal and acoustic insulation filling enclosed in a cover of said blanket,
   the blanket having a plurality of provision areas, each provision area for the passage of at least one aircraft component,
   each of the provision areas being devoid of insulation filling and being formed by a surface junction of two opposite faces of the cover, inducing a recess in at least one of said opposite faces, such that an opening can be formed in the provision area sealed with respect to the layer of insulation filling so that at least one aircraft component can pass through the blanket,
   wherein, in order to cover at least one of said provision areas, said insulation device comprises a detachable complementary assembly associated with the at least one provision area,
   said detachable complementary assembly comprising a portion of at least one of thermal and acoustic insulation filling shaped to at least partly fit into the corresponding recess,
   a retention arrangement to retain the portion of insulation filling in the recess,
   said retention arrangement being provided with a detachable fixing arrangement to fix said detachable complementary assembly on said at least one face of the cover, wherein the portion of insulation filling of said detachable complementary assembly is positioned between the cover in the corresponding provision area and an upper outer surface of said retention arrangement,
   each provision area of the blanket through which at least one aircraft component passes, is provided with a component passage opening and is not provided with a detachable complementary assembly, while at least one provision area of the blanket through which no aircraft component passes, is covered by an associated detachable complementary assembly of which at least part of the insulation filling is housed in the recess induced by said provision area, and in which the retention arrangement to retain said insulation filling are fixed on said face of the cover of the blanket, and
   installing the blanket along said aircraft wall, passing through each component passage opening said at least one aircraft component.

7. The method according to claim 6, wherein each detachable complementary assembly of the insulation device is initially fixed on said at least one face of the cover of the blanket so as to cover the corresponding provision area, for each provision area of the blanket through which at least one aircraft component passes, the steps comprising:
   removing the detachable complementary assembly that covers said provision area, and
   forming the corresponding component passage opening in said provision area.

8. The method according to claim 6, wherein each detachable complementary assembly of the insulation device is initially detached from said at least one face of the cover of the blanket, and in which said component passage opening is formed in each provision area of the blanket through which it is planned to pass at least one aircraft component, and, for at least one provision area, through which no component passes, the associated detachable complementary assembly is fixed on said at least one face of the cover of the blanket so as to cover said provision area.

9. A method for manufacturing an insulation device, wherein said method comprises the following steps in sequence:
- preparing a layer of at least one of thermal and acoustic insulation filling;
- forming a plurality of through holes in said layer of insulation filling by removing a portion of insulation filling for each of said holes;
- enclosing the layer of insulation filling in a cover to form a blanket, the cover having two opposite faces;
- forming a surface junction of said opposite faces of the cover through each of the holes in said layer of insulation filling, inducing for each of these holes a recess of at least one of said faces of the cover, so as to form provision areas;
- for at least one of the provision areas previously formed, preparing a detachable complementary assembly associated with the provision area and comprising:
  a. a portion of insulation filling shaped to fit at least partly into the corresponding recess of said at least one face of the cover, and
  b. retention means for retaining the portion of insulation filling, said retention means being provided with detachable fastening means for fixing said detachable complementary assembly onto said at least one face of the cover, wherein the portion of insulation filling of said detachable complementary assembly is positioned between the cover in the corresponding provision area and an upper outer surface of said retention means.

10. The method according to claim 9, wherein the preparation of each detachable complementary assembly of the device comprises the following steps in sequence:
- arranging at least part of said portion of insulation filling previously removed from the hole corresponding to said associated provision area, in the corresponding recess of said at least one face of the cover; and
- covering said provision area with at least one sheet, and fixing part of the sheet in a detachable manner on said at least one face of the cover to retain the portion of insulation filling.

11. The method according to claim 10, comprising a step of fixing stiffeners on said at least one face of the cover, around each of said provision areas of the blanket, and in which said part of said sheet of each detachable complementary assembly is fixed in a detachable manner on the corresponding stiffener.

12. The method according to claim 11, wherein the step of fixing stiffeners is performed after making the junction of the opposite faces of the cover.

13. The method according to claim 12, wherein each stiffener covers the corresponding surface junction zone of the two opposite faces of the cover and delimits the corresponding recess at the end of said fixing step of the stiffener.

14. The method according to claim 9, wherein preparation of each detachable complementary assembly of the insulation device comprises a step comprising enclosing a portion of at least one of thermal and acoustic insulation filling in an envelope such that the individual assembly obtained has a central portion shaped to fit into the corresponding recess of said at least one face of the cover, and a peripheral portion that can be fixed detachably on said at least one face of the cover.

* * * * *